United States Patent
Tojo et al.

(10) Patent No.: US 6,242,077 B1
(45) Date of Patent: Jun. 5, 2001

(54) LOWLY ELECTRIFIABLE COMPOSITE POLYESTER FILM

(75) Inventors: Mitsuo Tojo; Toshikazu Uchida; Toshifumi Osawa, all of Sagamihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/214,038

(22) PCT Filed: Apr. 28, 1998

(86) PCT No.: PCT/JP98/01953
§ 371 Date: Dec. 28, 1998
§ 102(e) Date: Dec. 28, 1998

(87) PCT Pub. No.: WO98/49008
PCT Pub. Date: Nov. 5, 1998

(30) Foreign Application Priority Data

Apr. 30, 1997 (JP) .................................... 9-112445
Apr. 30, 1997 (JP) .................................... 9-112446

(51) Int. Cl.$^7$ ............................. B32B 27/36; G11B 5/704
(52) U.S. Cl. ...................... 428/141; 428/329; 428/332; 428/480; 428/481; 428/483; 428/510; 428/694 BR; 428/694 ML; 428/694 SG; 428/694 SL
(58) Field of Search ................................... 428/141, 332, 428/446, 480, 481, 483, 510, 522, 694 BR, 694 ML, 694 SG, 694 SL, 329

(56) References Cited

U.S. PATENT DOCUMENTS 5,306,538 * 4/1994 Kurihara et al. ..................... 428/141

FOREIGN PATENT DOCUMENTS

| 0 572 224 | 12/1993 | (EP) . |
| 3-82537 | 4/1991 | (JP) . |
| 4-144734 | 5/1992 | (JP) . |
| 5-98050 | 4/1993 | (JP) . |
| 6-316644 | 11/1994 | (JP) . |

* cited by examiner

Primary Examiner—Blaine Copenheaver
Assistant Examiner—Leanna Roche
(74) Attorney, Agent, or Firm—Sughru, Mion, Zinn, Macpeak & Seas, PLLC

(57) ABSTRACT

The present invention relates to a low electrostatic composite polyester film comprising a base film C, a coating layer A formed on one side of the base film C, and a coating layer B formed on the other side of the base film C, where (1) the coating layer A is formed of a water-soluble or water-dispersible resin coating inert particles and has a center line average roughness (Ra–A) of the surface of 0.1 to 2 nm; (2) the coating layer B includes 1 to 40 wt % of inert particles and a composition containing a water-soluble or water-dispersible resin, the resin-containing composition containing 5 to 85 wt % of a silicone-modified polyester resin or 1 to 30 wt % of silicone or wax based on the layer B; and (3) the base film C is formed of an aromatic polyester. According to the present invention, it is possible to provide a composite polyester film useful as a base film for a magnetic recording medium that has low electrostatic properties and is excellent in not only blocking resistance and abrasion resistance but also electromagnetic conversion characteristics and adhesion to a back coat.

12 Claims, No Drawings

LOWLY ELECTRIFIABLE COMPOSITE POLYESTER FILM

TECHNICAL FIELD

The present invention relates to a polyester film which can be used in a magnetic recording medium. More specifically, it relates to a low electrostatic polyester film, has no blocking between films, rarely experiences the transfer of a material to an opposite side of a coating layer caused by blocking and is suitable for use as a base film for a high-density magnetic recording medium having excellent electromagnetic conversion characteristics, dropout resistance and adhesion of a back coat when used in a magnetic recording medium.

BACKGROUND ART

A magnetic recording medium such as a video tape, audio tape, memory tape, magnetic sheet or magnetic disk comprises a base film and a magnetic recording layer formed on the surface of the base film. On a surface opposite to the magnetic recording layer, a slippery back coat layer is formed in many cases to increase slipperiness. As the base film of the magnetic recording medium is mainly used a polyester film. The adhesion of the polyester film to the magnetic recording layer and the adhesion of the polyester film to the slippery back coat layer are important properties. If these adhesion properties are unsatisfactory, the magnetic recording layer and the back coat layer peel off and magnetic characteristics are completely lost in the sound recording, image recording or reproduction step of the magnetic recording medium.

Problems that the Invention Intends to Solve

There are known a large number of polyester base films having improved adhesion. They include, for example, a polyester base film whose surface is subjected to corona discharge, a polyester base film whose surface is coated with an adhesive resin and the like. In order to provide a marked adhesive effect, it is desired to coat the surface of a polyester base film with an adhesive resin.

In recent years, along with an increase in magnetic recording density, the surface of a polyester film used as a base film has been made less rough and more flat. In this case, blocking readily occurs in the roll of a conventional polyester base film coated with an adhesive resin and the film is easily broken or torn when it unrolled in the production process of a magnetic medium.

Particularly, in a vacuum-deposited tape having a magnetic recording thin film layer on the surface of a polyester base film, such as a deposited video tape, the polyester base film has a low surface roughness and hence, the slipperiness of the tape traveling surface must be improved by forming a back coat layer on a side opposite to a magnetic recording layer. When the back coat layer is coated with an adhesive resin by a conventional technology to improve the adhesion of the back coat layer to the polyester film, blocking readily occurs because the surface roughness of the polyester base film is extremely low.

It is considered that this blocking is caused by the fact that moisture contained in the air permeates into the surface of the film or penetrates between surfaces of films and the surfaces of the films become a state that they are adhered to each other by pressure between the films. Although film rolls after film production or before use are kept at low humidity at a plant and it is possible to prevent blocking to a certain degree by strictly controlling storage conditions, there is no radical solution to this problem. Particularly, in the case of a polyester film for a deposited magnetic recording medium, it is impossible to prevent blocking of an adhesive film by the control of humidity alone.

A blocked rolled film may be broken when it is unrolled, or even if it is not broken, a material of a coating layer or polyester film itself may be transferred to a contacting surface by local blocking, and a dropout may be produced when a tape is formed from such a film.

A polyester film which is readily blocked is easily electrified and a high electrostatic film involves such problems that the handling properties of the film greatly deteriorate at the time of film formation and tape formation, sparks generated by electrostatic charge may ignite an organic solvent used for the formation of a tape, the film easily adsorbs suspending dust in the air electrically, and in particular, the dust causes a dropout in a deposited tape and the like which require high-density recording.

It is an object of the present invention to provide a low electrostatic polyester film whose amount of electrostatic charge is small and which is free from blocking between films, rarely experiences the transfer of a material to an opposite side of a coating layer caused by blocking and is suitable for use as a base film for a high-density magnetic recording medium having excellent electromagnetic conversion characteristics, dropout resistance and adhesion of a back coat when it is used in a magnetic recording medium.

Means for Solving the Problems

According to the studies conducted by the inventors of the present invention, it has been found that the above object of the present invention can be attained by a low electrostatic composite polyester film having the following features (1) to (3), which comprises a base film C, a coating layer A formed on one side of the base film C and a coating layer B formed on the other side of the base film C.

(1) The coating layer A is formed of a water-soluble or water-dispersible resin containing inert particles having an average particle diameter of 5 to 100 nm and has protrusions at a density of $1 \times 10^6$ to $1 \times 10^8/mm^2$ on the surface and a center line average roughness (Ra–A) of the surface of 0.1 to 2 nm.

(2) The coating layer B comprises 1 to 40 wt % of inert particles having an average particle diameter of 20 to 100 nm and 60 to 99 wt % of a composition containing a water-soluble or water-dispersible resin and the resin-containing composition contains 5 to 85 wt % of a silicone-modified polyester resin or 1 to 30 wt % of silicone or wax based on the layer B.

(3) The base film C is an aromatic polyester film which may contain no inert particles or may contain inert particles having an average particle diameter of 5 to 2,000 nm in an amount of 0.001 to 5.0 wt %.

The present invention is a low electrostatic composite polyester which comprises at least three layers: a polyester base film C, a coating layer A formed on one side of the polyester film C and a coating layer B formed on the other side of the polyester film C and has the improved property of suppressing charging with static electricity by means of the coating layer A and/or the coating layer B and blocking between films.

The low electrostatic composite polyester film of the present invention will be described in detail hereinafter.

The aromatic polyester forming the core layer C of the composite film of the present invention is selected from polyethylene terephthalate, polyethylene isophthalate, polytetramethylene terephthalate, poly-1,4-cyclohexylene dimethylene terephthalate, polyethylene-2,6-naphthalene dicarboxylate and the like. Of these, polyethylene terephthalate and polyethylene-2,6-naphthalene dicarboxylate are preferred.

The above polyester may be either a homopolyester or a copolyester. Copolymer components that are copolymerizable with polyethylene terephthalate and polyethylene-2,6-naphthalene dicarboxylate include diol components such as diethylene glycol, propylene glycol, neopentyl glycol, polyoxyethylene glycol, p-xylene glycol and 1,4-cyclohexanedimethanol; other dicarboxylic acid components such as adipic acid, sebacic acid, phthalic acid, isophthalic acid, terephthalic acid (for polyethylene-2,6-naphthalene dicarboxylate), 2,6-naphthalenedicarboxylic acid (for polyethylene terephthalate) and 5-sodium sulfoisophthalic acid; oxycarboxylic acid components such as p-oxyethoxybenzoic acid; and the like. The amount of the copolymer component is preferably 20 mol % or less, more preferably 10 mol % or less, based on the total of all dicarboxylic acid components.

Further, a polyfunctional compound having a 3 or more functional groups, such as trimellitic acid or pyromellitic acid, may be copolymerized. In this case, it can be copolymerized in such an amount that the polymer is substantially linear, for example, in an amount of 2 mol % or less.

The polyester film as the base film C in the present invention may or may not contain inert particles. When it contains inert particles, the inert particles may be either organic or inorganic. As will be described later, the inert particles to be contained in the base film C may be different from the inert particles contained in the coating layer A and the coating layer B in type and average particle diameter. Illustrative examples of the organic inert particles include core-shell structured particles such as crosslinked polystyrene, polystyrene-divinylbenzene copolymer, polymethyl methacrylate, methyl methacrylate copolymer, methyl methacrylate crosslinked copolymer, polytetrafluoroethylene, polyvinylidene fluoride, polyacrylonitrile, benzoguanamine resin and graft copolymers comprising these polymers. Illustrative examples of the inorganic inert particles include silica, alumina, titanium dioxide, feldspar, kaolin, talc, graphite, calcium carbonate, molybdenum disulfide, carbon black and barium sulfate. These particles can be added to a reaction system, preferably as a slurry contained in glycol, during the production of a polyester, for example, at any time during an ester interchange reaction or a polycondensation reaction when it is produced by an ester interchange method, or at any time when it is produced by a direct polymerization method. The average particle diameter of the inert particles is preferably 5 to 2,000 nm, more preferably 10 to 1,800 nm and the amount of the inert particles is preferably 0.001 to 5 wt %, more preferably 0.001 to 2 wt %, particularly preferably 0.01 to 1.5 wt % based on the polyester.

The base film C has a thickness of 1 to 30 $\mu$m, referably 3 to 25 $\mu$m.

A description is subsequently given of the coating layer A formed on the surface of one side of the base film C as a composite component.

Illustrative examples of the water-soluble or water-dispersible resin forming the coating layer A of the present invention include acrylic resins, polyester resins, acryl-polyester resins, alkyd resins, phenol resins, epoxy resins, amino resins, polyurethane resin, vinylacetate resins, vinyl chloride-vinylacetate copolymer and the like. From the viewpoint of the adhesion to an aromatic polyester, protrusion retainability and slipperiness of the base film C, acrylic resins, polyester resins and acryl-polyester resins are preferred. These water-soluble and water-dispersible resins may be either a homopolymer, copolymer or mixture.

The water-soluble and water-dispersible acrylic resins include, for example, acrylic acid esters (residual alcohol groups thereof include a methyl group, ethyl group, n-propyl group, isopropyl group, n-butyl group, isobutyl group, t-butyl group, 2-ethylhexyl group, cyclohexyl group, phenyl group, benzyl group, phenylethyl group and the like): methacrylic acid esters (residual alcohol groups thereof are the same as above); hydroxy-containing monomers such as 2-hydroxyethyl acrylate, 2-hydroxyethyl methacrylate, 2-hydroxypropyl acrylate and 2-hydroxypropyl methacrylate; amide group-containing monomers such as acrylamide, methacrylamide, N-methyl ethacrylamide, N-methyl acrylamide, N-methylol acrylamide, N-methylol methacrylamide, N,N-dimethylol crylamide, N-methoxymethyl acrylamide, N-methoxymethyl ethacrylamide and N-phenyl acrylamide; amino group-containing monomers such as N,N-diethyl aminoethyl acrylate and N,N-diethyl aminoethyl methacrylate; epoxy group-containing monomers such as glycidyl acrylate, glycidyl methacrylate and allyl glycidyl ether; monomers containing a sulfonic acid group or salt thereof, such as styrenesulfonic acid, vinylsulfonic acid and salts thereof (such as sodium salts, potassium salts and ammonium salts thereof); monomers containing a carboxyl group or salt thereof, such as crotonic acid, itaconic acid, acrylic acid, maleic acid, fumaric acid and salts thereof (such as sodium salts, potassium salts and ammonium salts thereof); monomers containing an acid anhydride group such as maleic anhydride and itaconic anhydride; combinations of monomers such as vinyl isocyanate, allyl isocyanate, styrene, vinyl methyl ether, vinyl ethyl ether, vinyl trisalkoxysilane, alkyl maleic acid monoester, alkyl fumaric acid monoester, acrylonitrile, methacrylonitrile, alkyl itaconic acid monoester, vinylidene chloride, vinyl acetate and vinyl chloride. The water-soluble and water-dispersible acrylic resins containing a (meth) acrylic monomer such as an acrylic acid derivative or methacrylic acid derivative in an amount of 50 mol % or more are preferred, and those containing methyl methacrylate are particularly preferred.

The water-soluble or water-dispersible acrylic resin can be self-crosslinked with a functional group in the molecule or can be crosslinked using a crosslinking agent such as a melamine resin or epoxy compound.

Illustrative examples of the acid component forming the water-soluble or water-dispersible polyester resin used to form the coating layer A of the present invention include polycarboxylic acids such as terephthalic acid, sophthalic acid, phthalic acid, 1,4-cyclohexanedicarboxylic acid, 2,6-naphthalenedicarboxylic acid, 4,4'-diphenyldicarboxylic acid, adipic acid, sebacic acid, dodecanedicarboxylic acid, succinic acid, 5-sodium sulfoisophthalic acid, 2-potassium sulfoterephthalic acid, trimellitic acid, trimesic acid, trimellitic anhydride, phthalic anhydride, p-hydroxybenzoic acid and monopotassium trimellitate. Illustrative examples of the hydroxyl compound component include polyhydroxy compounds such as ethylene glycol, propylene glycol, 1,3-propanediol, 1,4-butanediol, 1,6-hexanediol, neopentyl glycol, 1,4-cyclohexane dimethanol, p-xylylene glycol, adduct of bisphenol A with ethylene oxide, diethylene glycol, triethylene glycol, polyethylene oxide glycol, polytetramethylene oxide glycol, dimethylolpropionic acid, glycerin, trimethylol propane, sodium dimethylol ethylsulfonate, potassium dimethylolpropionate. Polyester resins can be produced from these compounds in accordance with a common used method. To produce an aqueous coating, an aqueous polyester resin containing a 5-sodium sulfoisophthalic acid component or carboxylate group is preferably used. The polyester resin can be self-crosslinked with a functional group in the molecule or can be crosslinked using a curing agent such as a melamine resin or epoxy resin.

The water-soluble or water-dispersible acryl-polyester resin used to form the coating layer A of the present invention comprehends both acryl-modified polyester resins and polyester-modified acrylic resins and is formed by bonding the above acrylic resin component and the above polyester resin component together and exemplified by graft-type and block-type resins. The acryl-polyester resin can be produced by adding a radical initiator to both ends of a polyester resin to polymerize an acrylic monomer, adding a radical initiator to the side chain of a polyester resin to polymerize an acrylic monomer, or adding a hydroxyl group to the side chain of an acrylic resin to react it with a polyester having an isocyanate group or carboxyl group at a terminal so as to form a comb-shaped polymer.

The coating layer A contains inert particles (to be referred to as "inert particles A" hereinafter) which are made from an organic material such as crosslinked polystyrene, polystyrene-divinylbenzene, polymethyl methacrylate, methyl methacrylate copolymer, methyl methacrylate crosslinked copolymer, polytetrafluoroethylene, polyvinylidene fluoride, polyacrylonitrile or benzoguanamine resin, or an inorganic material such as silica, alumina, titanium dioxide, kaolin, talc, graphite, calcium carbonate, feldspar, molybdenum disulfide, carbon black or barium sulfate. A multi-layer-structured core-shell-type particle whose core and shell are made from materials having different properties may be used.

The inert particles A have an average particle diameter of 5 to 100 nm, preferably 10 to 50 nm. Further, the inert particles A preferably have a uniform particle size distribution. When the average particle diameter is smaller than 5 nm, slipperiness and abrasion resistance deteriorate. On the other hand, when the average particle diameter is larger than 100 nm, the particle falls off and abrasion resistance deteriorates. Further, since spacing between the magnetic head and the film becomes large, it is difficult to provide a high-density magnetic recording medium.

The inert particles A are contained in the coating layer A to ensure that the surface protrusion density should be $1 \times 10^6$ to $1 \times 10^8/mm^2$. When the surface protrusion density is lower than $1 \times 10^6/mm^2$, the traveling durability of the resulting magnetic recording medium becomes insufficient. On the other hand, when the surface protrusion density is higher than $1 \times 10^8/mm^2$, electromagnetic conversion characteristics are adversely affected. The surface protrusion density is preferably $2 \times 10^6$ to $5 \times 10^7/mm^2$, more preferably $3.0 \times 10^6$ to $3.0 \times 10^7/mm^2$.

The thickness of the coating layer A is in the range of 1 to 100 nm, preferably 3 to 70 nm. The ratio (t/d) of the thickness (t nm) of the coating layer A to the average particle diameter (d nm) of the inert particles A is in the range of 0.05 to 0.8, preferably 0.08 to 0.6, more preferably 0.1 to 0.5.

When this ratio (t/d) is larger than 0.8, the protrusion-forming function of the inert particles A lowers and the traveling durability of the resulting magnetic recording medium becomes insufficient. When the ratio is smaller than 0.05, particles on the surface of the laminate film are abraded by contacting the guide roll in the process of film formation, whereby traveling durability becomes insufficient and abraded particles are adhered to and accumulated on the film, with the result of an increase in the number of dropouts.

The coating layer A in the present invention is formed by applying a coating solution containing the above inert particles and the above water-soluble or water-dispersible resin onto at least one side of a polyester core layer and drying it. The solid content of this coating solution is 0.2 to 10 wt %, preferably 0.5 to 5 wt %, particularly preferably 0.7 to 3 wt %. This coating solution may contain other components such as a surfactant, stabilizer, dispersant, UV absorber, thickener and the like in such amounts that do not impair the effect of the present invention.

The center line average roughness (Ra–A) of the coating layer A-forming surface is preferably 0.1 to 2 nm, more preferably 0.5 to 1.5 nm. When the value of (Ra–A) is larger than 2 nm, the electromagnetic conversion characteristics of the resulting metal thin film magnetic recording medium degrade. On the other hand, when the value of (Ra–A) is smaller than 0.1 nm, slipperiness markedly deteriorates, traveling durability becomes insufficient, and the film sticks to the magnetic head, thereby making sound from the tape. Therefore, the tape may not be able to be put into practical use.

In the composite polyester film of the present invention, the coating layer A is formed on the surface of one side of the base film C and the coating layer B is formed on the surface of the other side of the base film C. The coating layer B will be described in detail hereinafter.

The coating layer B comprises 1 to 40 wt % of inert particles having an average particle diameter of 20 to 100 nm and 60 to 99 wt % of a composition containing a water-soluble or water-dispersible resin. The resin-containing composition contains 5 to 85 wt % of a silicone-modified polyester resin or 1 to 30 wt % of silicone or wax based on the layer B.

The coating layer B comprehends (i) a coating layer containing a silicone-modified polyester resin (to be referred to as "coating layer B-1" hereinafter) and (ii) a coating layer containing silicone or wax (to be referred to as "coating layer B-2" hereinafter).

To help the understanding of the two coating layers, the coating layer B-1 and the coating layer B-2 will be described separately. A description is first given of the coating layer B-1.

The coating layer B-1 comprises 1 to 40 wt % of inert articles having an average particle diameter of 20 to 100 nm and 60 to 99 wt % of a composition containing a water-soluble or water-dispersible resin, and the resin-containing composition contains 5 to 85 wt % of a silicone-modified polyester resin based on the layer B-1.

The silicone-modified polyester resin in the coating layer B-1 is a water-soluble or water-dispersible resin and is a compound in which a silicone component and a polyester resin component are bonded together. This bonding system may be either graft-bonding or block-bonding, for example. Stated specifically, this silicone-modified polyester resin can be produced by adding a radical initiator to both terminals of a polyester resin to polymerize silicone, or by adding a hydroxyl group to the side chain of silicone to react it with a polyester having an isocyanate group or carboxyl group at a terminal so as to form a comb-shaped polymer.

Illustrative examples of the polyester resin component used for polymerization are the same as those listed for the polyester resin used in the coating layer A.

The silicone is a silicone compound having a chain component represented by the following formula and an epoxy group, amino group, hydroxyl group or other functional terminal group at a terminal:

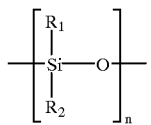

[wherein $R_1$ is —$CH_3$, —$C_6H_5$ or hydrogen atom, $R_2$ is —$CH_3$, —$C_6H_5$, hydrogen atom or functional group (such as epoxy group, amino group or hydroxyl group), and n is 100 to 7,000]. In the present invention, the silicone compound is not necessarily a homopolymer but may be a copolymer or a mixture of several homopolymers.

The weight ratio of the polyester resin component to the silicone component is 98:2 to 60:40, preferably 95:5 to 80:20. The content of the silicone-modified polyester resin in the coating layer B-1 is 5 to 85 wt %, preferably 20 to 80 wt %. When the content is smaller than 5 wt %, its effect is insufficient, thereby causing blocking or increasing the amount of electrostatic charge, while when the content is larger than 85 wt %, adhesion to a back coat degrades, the film is transferred to the contacting surface when rolled, or the contacting roll is stained when the film travels.

The coating layer B-1 may contain other water-soluble or water-dispersible resins or surfactant which have been described in the description of the coating layer A in such amounts that do not affect the effect of the present invention, in addition to the inert particles and the water-soluble or water-dispersible silicone-modified polyester resin. The surfactant is preferably a nonionic surfactant, particularly preferably a surfactant prepared by adding or bonding an alkyl alcohol, alkyl phenyl alcohol or higher fatty acid to polyethylene oxide. When the surfactant is added in an amount of 20 wt % or less, preferably 1 to 15 wt %, based on the coating layer B-1, a coating failure or cissing at the time of coating can be prevented advantageously.

Further, when a cellulose resin is added to the coating layer B-1 in an amount of 5 to 40 wt %, preferably 10 to 30 wt % based on the coating layer B-1, many small continuous wrinkles can be formed in the coating layer B-1, whereby the winding property of the film can be improved. Illustrative examples of the cellulose resin include ethyl cellulose, methyl cellulose, acetyl cellulose, acetoacetyl cellulose, nitrocellulose, cellulose acetate butyrate and the like.

A description is subsequently given of the coating layer B-2. The coating layer B-2 comprises 1 to 40 wt % of inert particles having an average particle diameter of 20 to 100 nm and 60 to 99 wt % of a composition containing a water-soluble or water-dispersible resin, and the resin-containing composition contains 1 to 30 wt % of silicone or wax based on the coating layer B-2.

The silicone contained in the coating layer B-2 is a silicone compound having a chain component represented by the following formula and an epoxy group, amino group, hydroxyl group or other functional terminal group at a terminal:

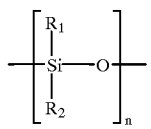

[wherein $R_1$ is —$CH_3$, —$C_6H_5$ or hydrogen atom, $R_2$ is —$CH_3$, —$C_6H_5$, hydrogen atom or functional group (such as epoxy group, amino group or hydroxyl group), and n is 100 to 7,000]. In the present invention, the silicone compound is not necessarily a homopolymer but may be a copolymer or a mixture of several homopolymers.

The wax may be petroleum wax, vegetable wax, mineral wax, animal wax, low molecular weight polyolefin or the like and is not particularly limited. Illustrative examples of the petroleum wax include paraffin wax, microcrystalline wax, oxide wax and the like. Illustrative examples of the vegetable wax include candelilla wax, carnauba wax, Japan wax, oricurie wax, cane wax, rosin-modified wax and the like.

The content of silicone or wax in the coating layer B-2 is 1 to 30 wt %, preferably 1 to 15 wt % based on the coating layer B-2. When the content is smaller than 1 wt %, blocking occurs and the amount of electrostatic charge increases, while when the content is larger than 30 wt %, adhesion of a back coat degrades, the film is transferred to the contacting surface when rolled, or the contacting roll is stained when the film travels.

Illustrative examples of the water-soluble or water-dispersible resin forming the coating layer B-2 include acrylic resins, polyester resins, acryl-polyester resins, alkyd resins, phenol resins, epoxy resins, amino resins, polyurethane resins, vinyl acetate resins and vinyl chloride-vinylacetate copolymer, as those listed for the water-soluble or water-dispersible resin for the coating layer A.

Of the above water-soluble and water-dispersible resins, at least one resin selected from the group consisting of acrylic resins, polyester resins and acryl-polyester resins is preferred, and a combination of these resins and a cellulosic resin is more preferred. Illustrative examples of the acrylic resins, polyester resins and acryl-polyester resins are the same as those listed for the coating layer A. By using the water-soluble or water-dispersible resin in conjunction with a cellulosic resin, many small continuous wrinkles can be formed in the coating layer B-2, whereby the winding property of the film can be improved. Illustrative examples of the cellulosic resin include ethyl cellulose, methyl cellulose, acetyl cellulose, acetacetyl cellulose, nitrocellulose, cellulose acetate butyrate and the like. The content of cellulose in the coating layer B-2 is 5 to 40 wt %, preferably 10 to 30 wt %, based on the coating layer B-2.

Both of the coating layers B-1 and B-2 contain inert particles. The inert particles contained in these coating layers (to be referred to as "inert particles B") have an average particle diameter of 20 to 100 nm, preferably 20 to 50 nm, and the content thereof is 1 to 40 wt %, preferably 5 to 30 wt %. When the average particle diameter of the particles is smaller than 20 nm or the content is smaller than 1 wt %, the winding property and conveyance property in the film formation process of the film become unsatisfactory.

On the other hand, when the average particle diameter is larger than 100 nm, the particles readily fall off from the coating film. When the content of the inert particles B contained in the coating layer B is larger than 40 wt %, the coating layer B is readily abraded due to a reduction in the strength of the coating layer B itself.

The inert particles B contained in the coating layer B may be either particles of an organic material such as crosslinked polystyrene, polystyrene-divinylbenzene, polymethyl methacrylate, methyl methacrylate copolymer, methyl methacrylate crosslinked copolymer, polytetrafluoroethylene, polyvinylidene fluoride, polyacrylonitrile or benzoguanamine resin, or particles of an inorganic material such as silica, alumina, titanium dioxide, kaolin, talc, graphite, calcium carbonate, feldspar, molybdenum disulfide, carbon black or barium sulfate, as those listed for the coating layer A. The inert particles may be core-shell-type particles.

The coating layer B has a thickness of 1 to 100 nm, preferably 3 to 70 nm.

The center line average roughness (Ra–B) of the coating layer B-forming surface is 1 to 30 nm, preferably 2 to 20 nm. When the content of cellulose is smaller than 5 wt % or the value of (Ra–B) is smaller than 1 nm, the winding property and conveyance property in the film formation process of the film become unsatisfactory or blocking readily occurs. On the other hand, when the value of (Ra–B) is larger than 30 nm, the coating layer B is easily abraded.

When the base film C is formed of a coextruded layer, the winding property and conveyance property in the film formation process of the film can be fully provided according to the type of inert particles to be contained in the surface layer ($C_B$) on which the coating layer B is formed. Unlike the case where the base film C is a single-layer film, if the base film C is a multi-layer film, a cellulosic resin is not necessarily contained. As a matter of course, the cellulosic resin may be contained.

The inert fine particles contained in the base film C of the surface layer ($C_B$) on which the coating layer B is formed consist of single type of particles or two or more types of particles which differ in size. The average particle diameter of the particles of single type and the largest particles among two or more types of particles is 100 to 1,000 nm, preferably 100 to 500 nm. The content of the particles is 0.001 to 5.0 wt %, preferably 0.005 to 1.0 wt %. When the average particle diameter is smaller than 100 nm or the content is smaller than 0.001 wt %, the winding property and conveyance property in the film formation process of the film become unsatisfactory and blocking readily occurs. When the average particle diameter is larger than 1,000 nm or the content is larger than 5 wt %, the effect of particles projecting to the surface on the coating layer A side becomes remarkable and electromagnetic conversion characteristics degrade.

The base film C of the present invention can be produced by methods that are conventionally known per se.

Taking a biaxially oriented polyester film as an example, when the base film C is a single-layer film, the polyester resin is extruded into a film from a nozzle at a melting point of Tm° C. to (Tm+70)° C. and quenched at 40 to 90° C. to give an unstretched film. This unstretched film is stretched to 2.5 to 8.0 times, preferably 3.0 to 7.5 times, in a monoaxial direction (longitudinal or transverse direction) at a temperature of (Tg–10) to (Tg+70)° C. (Tg: glass transition temperature of resin used) in accordance with a commonly used method. Thereafter, coating solutions for forming the coating layer A and coating layer B are each applied to both sides of the film, and the film is stretched to 2.5 to 8.0 times, preferably 3.0 to 7.5 times in a direction perpendicular to the above direction at a temperature of Tg to (Tg+70)° C. Further, the film may be stretched again in the longitudinal and/or transverse direction as required. That is, 2-stage, 3-stage, 4-stage or multi-stage stretching may be carried out. The total stretch ratio is generally 9 times or more, preferably 12 to 35 times, more preferably 15 to 32 times in terms of area stretch ratio. Subsequently, the biaxially oriented film is heat-set and crystallized at a temperature of (Tg+70) to (Tm–10)° C., 180 to 250° C. for example, to provide excellent dimensional stability. The heat setting time is preferably 1 to 60 seconds.

When the base film C is formed by a coextrusion method, two types of polyester resins are laminated together in a molten state in the nozzle or before the nozzle (the former is generally called "multi-manifold system" and the latter "feedblock system") and coextruded to form a double-layer unstretched laminate film having an appropriate thickness ratio, which subsequently undergoes the same steps as of the single-layer film. A biaxially oriented composite film having excellent interlayer adhesion is obtained by this method.

In the production of a composite film, additives such as a stabilizer, colorant, resistivity-adjusting agent (antistatic agent) for a molten polymer, and the like may be added to the polyester resin as required.

The composite polyester film of the present invention can be formed into a deposited magnetic recording medium for high-density recording which has excellent electromagnetic conversion characteristics such as output at a short-wavelength range, SIN and C/N, few dropouts and a small error rate by forming a ferromagnetic metal thin film layer made from iron, cobalt, chromium or an alloy or oxide mainly composed thereof on the surface of the coating layer A by vacuum deposition, sputtering, ion plating or the like, a protective layer made from diamond-like carbon (DLC) and a fluorine-containing carboxylic acid-based lubricant layer on the surface of the ferromagnetic metal thin film layer according to purpose or application, or as required, and a known back coat layer on the surface of the coating layer B. This deposited magnetic recording medium is extremely useful as a tape medium for Hi8 for analog signal recording, and digital video cassette recorder (DVC), data 8 mm and DDSIV for digital signal recording.

The composite polyester film of the present invention can be formed into a metal coated magnetic recording medium for high-density recording which has excellent electromagnetic conversion characteristics such as output at a short-wavelength range, S/N and C/N, few dropouts and a small error rate by uniformly dispersing iron or needle-like magnetic fine powder mainly composed of iron into a binder such as polyvinyl chloride or vinyl chloride-vinyl acetate copolymer, applying the obtained binder to the surface of the coating layer A to ensure that the thickness of a magnetic layer is to be 1 $\mu$m or less, preferably 0.1 to 1 $\mu$m, and further forming a back coat layer on the surface of the coating layer B by a known method. A non-magnetic layer containing titanium oxide fine powder may be formed on the coating layer A as a layer underlying the metal powder containing magnetic layer as required by dispersing the titanium oxide fine powder into the same organic binder as that for the magnetic layer and applying the obtained binder to the coating layer A. This metal coated magnetic recording medium is extremely useful as a tape medium for 8 mm video, Hi8, β-cam SP and W-VHS for analog signal recording and digital video cassette recorder (DVC), data 8 mm, DDSIC, digital β-cam, D2, D3 and SX and the like for digital signal recording.

Further, the composite polyester film of the present invention can be formed into a coated magnetic recording medium for high-density recording which has excellent electromagnetic conversion characteristics such as output at a short-wavelength range, S/N and C/N, few dropouts and a small error rate by uniformly dispersing needle-like magnetic fine powder such as iron oxide or chromium oxide or lamellar magnetic fine powder such as barium ferrite into a binder such as polyvinyl chloride or vinyl chloride-vinyl acetate copolymer, applying the obtained binder to the surface of the coating layer A to ensure that the thickness of a magnetic layer is to be 1 $\mu$m or less, preferably 0.1 to 1 $\mu$m and further forming a back coat layer on the surface of the coating layer B by a known method. A non-magnetic layer containing titanium oxide fine powder may be formed on the coating layer A as a layer underlying the metal power containing magnetic layer as required by dispersing the titanium oxide fine powder into the same organic binder as that for the magnetic layer and applying the obtained binder to the coating layer A. This oxide coated magnetic recording medium is useful as a high-density oxide coated magnetic recording medium for data streamer QIC for digital signal recording.

Effect of the Invention

The composite polyester resin film of the present invention has a total thickness of ca. 2.5 to 20 μm and is advantageously used as a base for a magnetic recording medium. It is useful for a metal thin film-type magnetic recording medium. The composite polyester base film of the present invention can be used for a coated magnetic recording medium whose magnetic layer is 1 μm or less in thickness and for a digital signal recording-type magnetic recording medium.

According to the present invention, it is possible to provide a composite polyester film useful as a base film for a magnetic recording medium which is excellent in not only low electrostatic properties, blocking resistance and abrasion resistance but also electromagnetic conversion characteristics and adhesion of a back coat.

EXAMPLES

The following examples are given to further illustrate the present invention. Measurement methods used in the present invention are as follows.

(1) Average Particle Diameter of Particles (average particle diameter: 0.06 μm or more)

This is measured by the CP-50 centrifugal particle size analyzer of Shimadzu Corporation. A particle diameter equivalent to 50 mass percent, "equivalent spherical diameter", is read from a cumulative curve of the particles of each diameter and the amount thereof calculated based on the obtained centrifugal sedimentation curve, and is taken as the average particle diameter (refer to "Book of Particle Size Measurement Technology" issued by Nikkan Kogyo Press, pp. 242–247, 1975).

(2) Average Particle Diameter of Ultrafine Particles (average particle diameter: less than 0.06 μm)

Particles having an average particle diameter smaller than 0.06 μm which form small protrusions are measured by a light-scattering method. That is, it is expressed by the "equivalent spherical diameter" of the particles that account for 50 wt % of the total of all particles obtained by the NICOMP Model 270 submicron particle sizer of Nicomp Instruments Inc.

(3) Surface Roughness of Film (center line average roughness: Ra)

The center line average roughness (Ra) is measured in accordance with JIS-B601. In the present invention, a probe-type surface roughness meter (SURFCORDER SE-30C) of Kosaka Kenkyusho Co., Ltd. is used to conduct measurement under the following conditions.

| | | |
|---|---|---|
| (a) | radius of tip of probe | 2 μm |
| (b) | measurement pressure | 30 mg |
| (c) | cut off | 0.08 mm |
| (d) | measurement length | 8.0 mm |
| (e) | collection of data | |

The surface roughness of a single sample is measured 6 times, and measurement values excluding the largest value are used to obtain an average value as a center line average roughness (Ra).

(4) Number of Particle Protrusions

Using a SEM (scanning electron microscope T-300 of JEOL Corp.), 20 photos of the surface of a laminate film are taken at a magnification of 30,000× at an angle of 0° to count the number of granular protrusions and an average value thereof is calculated as the number of protrusions per 1 mm$^2$.

(5) Layer Thickness

The thickness of a film is measured at 10 random locations of the film by a micrometer and an average value of the measurement values is taken as the total thickness of the film. The thickness of a thin layer is measured by the following method, while the thickness of a thick layer is obtained by subtracting the thickness of the thin layer from the total thickness. That is, using a secondary ion mass spectrometer (SIMS), the concentration ratio (M$^+$/C$^+$) of an element derived from particles having the highest concentration among the particles contained in an portion of the film from the surface layer to a depth of 5,000 nm to the carbon element of a polyester is taken as a particle concentration, and a portion from the surface up to a depth of 5,000 nm in the thickness direction is analyzed. The particle concentration is naturally low in the surface layer but becomes higher as the distance of the measured point from the surface increases. In the case of the present invention, there are two cases; one is a case where after the particle concentration becomes a stable value 1 once, it increases or decreases to a stable value 2, and the other is a case where after the particle concentration becomes a stable value 1, it decreases continuously. Based on this distribution curve, in the former case, a depth which provides a particle concentration of (stable value 1+stable value 2)/2 is taken as the thickness of the layer whereas, in the latter case, a depth that provides a particle concentration of one-half of the stable value 1 (deeper than the depth that gives a stable value 1) is taken as the thickness of the layer.

The measurement conditions of a secondary ion mass spectrometer (SIMS: 6300 of PERKIN ELMER Co., Ltd.) are as follows.

| | |
|---|---|
| species of primary ion | O$^{2+}$ |
| primary ion acceleration voltage | 12 KV |
| amount of primary ion current | 200 mA |
| luster area | 400 μm☐ |
| analysis area | gate 30% |
| measurement degree of vacuum | 6.0 × 10$^{-9}$ Torr |
| E-GUNN | 0.5 kV–3.0 A |

When most of the particles contained in a portion of from the surface layer to a depth of 5,000 nm are organic polymer particles other than a silicone resin, it is difficult to measure them with SIMS. Therefore, while the film is etched from the surface, a concentration distribution curve similar to the above is measured by FT-IR (Fourier transform infrared spectrometry) or XPS (X-ray photo-electron spectrometry) depending on a particle to obtain a thickness of the layer.

The above measurement method is very effective in the case of a coextruded layer. In the case of a coating layer, a piece of a film is fixed with an epoxy resin and molded to prepare an ultra-thin piece having a thickness of about 60 nm with a microtome (by cutting the film in parallel with a flow direction). This sample is observed by a transmission electron microscope (Model H-800 of Hitachi, Ltd.) to obtain the thickness of the layer from the interface of the layer.

(6) Density of Transferred Foreign Substances

A roll of a film obtained by slitting the film to a width of 300 mm and a length of 5,000 m at a tensile force of $1.7 \times 10^6$ kg/M$^2$ and a contact pressure of $1.5 \times 10^7$ kg/m$^2$ is left under a vacuum atmosphere of $10^{-5}$ Torr for 3 hours, adjacent portions of the film are adhered to each other by removing air between them, the roll is cut open, a polyester film of a core portion is sampled, an aluminum thin film is formed on the surface of the coating layer A of the polyester film to a thickness of 0.2 $\mu$m from an inclination angle of 45° by a vapor deposition method and scanned per1 cm$^2$ of the film by a transmission microscope at a magnification of 4,000×, and the number of transmission rays having a maximum length of a non-deposited portion (equivalent to the height of a protrusion) of 0.2 mm or more produced by the shadow of the protrusion (that is, the density of large transferred foreign substances having a height of 0.2 mm/400=0.5 $\mu$m or more) is counted.

Evaluation is made based on the following criteria.

○: less than 20/cm$^2$

Δ: 20 to 50/cm$^2$

X: more than 50/cm$^2$ (7) Electrostatic Properties

A polyester film (10 $\mu$m×500 mm×3,000 m) is rewound at a speed of 150 m/min at 23° C. and 75% RH and the amount of electrostatic charge generated on rewinding of the roll is measured using the Model-203 digital-test electric measuring instrument of Hugle Electronics Co., Ltd.

○: less than 2.5 kV

Δ: 2.5 to 5.0 kV

X: more than 5.0 kV (8) Blocking

Two films are superposed in such a manner that a treated surface of one film and an untreated surface of the other film are brought into contact with each other, and a pressure of 150 kg/cm$^2$ is applied to the resulting laminate at 60° C. and 80% RH for 65 hours. Thereafter, these films are separated from each other, and blocking resistance is evaluated by peeling (g per 5 cm).

Evaluation is made from peeling based on the following criteria.

○: 0 to less than 10 g/cm

Δ: 10 to less than 15 g/cm

X: 15 g/cm or more to rupture (9) Abrasion Resistance

A film is cut to a length of 25 to 30 cm and a width of ½ inch, a razor blade is applied to the coating layer B of the film at an angle of 90° C. and a depth of 0.5 mm, and the width in a depth direction of abraded powder adhered to the razor blade is obtained from photomicrography (magnification of 160×) when the film is run at a speed of 6.7 cm/sec under a load of 500 g/0.5 inch. Abrasion resistance is evaluated as (⊚) when the width in a depth direction of the abraded powder is less than 3 $\mu$m, (○) when the width is 3 to 5 $\mu$m and (X) when the width is more than 5 $\mu$m. The larger the width in a depth direction of the abraded powder the better the abrasion resistance is.

(10) Production of Magnetic Tape and Evaluation of Characteristic Properties Thereof Two 100% cobalt ferromagnetic thin film layers (each layer has a thickness of about 0.1 $\mu$m) are formed on the surface of the coating layer B of a laminate film to a total thickness of 0.02 $\mu$m by a vapor deposition method. A diamond-like carbon (DLC) film layer and a fluorine-containing carboxylic acid-based lubricant layer are formed successively on the surface of the thin film layers, and further, a back coat layer having the following composition is formed on the surface of the coating layer B and dried.

The thickness of the back coat layer after drying is 0.8 $\mu$m.

| composition of back coat layer: | |
|---|---|
| carbon black | 100 parts by weight |
| thermoplastic polyurethane | 60 parts by weight |
| isocyanate compound (Colonate L of Nippon Polyurethane Kogyo Co., Ltd.) | 18 parts by weight |
| silicone oil | 0.5 part by weight |
| methyl ethyl ketone | 250 parts by weight |

Thereafter, the film is slit to a width of 8 mm and loaded into a commercial 8 mm video cassette. The following commercial devices are used to measure the characteristic properties of the tape used device:

8 mm video tape recorder: EDV-6000 of Sony Corporation

C/N measurement: noise meter of Shibasoku Co., Ltd.

(1) C/N Measurement

A signal having a recording wavelength of 0.5 $\mu$m (frequency of about 7.4 MHz) is recorded, and the ratio of values of its reproduced signal at 6.4 MHz and 7.4 MHz is taken as a relative value of C/N when the C/N of a deposited tape for a commercial 8 mm video is defined to be 0 dB.

○: more than 0 dB

Δ: −3 to 0 dB

X: less than −3 dB (2) Dropout (D/O) Measurement

Using a dropout counter, the number of dropouts per minute is counted at 15 $\mu$s/18 dB.

○: 0 to less than 20/min

Δ: 20 to 50/min

X: more than 50/min (3) Adhesion of Back Coat

Scotch Tape No. 600 (of 3M Co., Ltd.) having a width of 19.4 mm and a length of 8 cm is affixed to a back coat in such a manner that an air bubble is not included between them, the back coat is rolled by a manual load roll described in JIS. C2701 (1975), a 5-cm laminated portion of this sample is peeled in the perpendicular direction at a head speed of 300 mm/min using the UM-11 Tensilon of Toyo Baldwin Co., Ltd., and the peel strength at this point is obtained and divided by the width of the tape to obtain the adhesion of the back coat in unit of g/cm. In peeling in the perpendicular direction, the laminate is separated with the tape side located below at a chuck interval of 5 cm.

The adhesion of the back coat is evaluated from peel strength based on the following criteria.

○: 50 g/cm$^2$ or more

Δ: 20 g/cm$^2$ or more and less than 50 g/cm$^2$

X: less than 20 g/cm$^2$

Example 1

Dimethyl 2,6-naphthalenedicarboxylate and ethylene glycol were polymerized in the presence of manganese acetate as an ester interchange catalyst, antimony trioxide as a polymerization catalyst and phosphorous acid as a stabilizer in accordance with a commonly used method to give polyethylene-2,6-naphthalate (PEN) containing substantially no inert particles.

This polyethylene-2,6-naphthalate was dried at 170° C. for 6 hours, supplied to an extruder, molten at a temperature of 280 to 300° C., extruded into a sheet from a die and quenched to give a 82-μm-thick unstretched film.

The obtained unstretched film was preheated, stretched to 3.5 times in a longitudinal direction between low-speed and high-speed rolls at a film temperature of 95° C. and quenched. A water-soluble coating solution having composition for forming the coating layer A shown in Table 1 was applied to one side of this stretched film to a thickness of 0.009 μm (after stretching and drying) and a water-soluble coating solution for forming the coating layer B was applied to the other side of the film to a thickness of 0.035 μm (after stretching and drying). Thereafter, the film was supplied to a stenter to be stretched to 5.6 times in a transverse direction at 150° C. The obtained biaxially oriented film was heat-set with hot air of 200° C. for 4 seconds to give a 4.9-μm-thick biaxially oriented polyester laminate film. The results are shown in Table 1 below.

Examples 2 and 3 and Comparative Examples 1 to 5

Polyester films were obtained in the same manner as in Example 1 except that the compositions of the coating layer A and the coating layer B were changed as shown in Table 1. The results are shown in Table 1 below.

As is evident from Table 1, the composite polyester film of the present invention is excellent in low electrostatic properties, blocking resistance and the effect of suppressing the transfer of materials, and is remarkably excellent in electromagnetic conversion characteristics, dropout resistance and adhesion of a back coat when used as a magnetic recording medium. In contrast to this, it is understood that films which do not satisfy the requirements of the present invention cannot achieve these characteristic properties at the same time.

TABLE 1

| | coating layer A | | | coating layer B | | | | | |
|---|---|---|---|---|---|---|---|---|---|
| | | contained particles A | | | | | | contained particles B | |
| | type of resin | material | average particle diameter [nm] | silicone-modified polyester resin type | content [wt %] | other resin type | content [wt %] | material | average particle diameter [nm] | content [wt %] |
| Ex. 1 | A | acrylic copolymer | 40 | C | 81 | — | — | acrylic copolymer | 40 | 9 |
| Ex. 2 | A | silica | 13 | D | 30 | A | 45 | crosslinked polystyrene | 50 | 15 |
| Ex. 3 | B | core-shell*1 type particles | 25 | C | 20 | E | 50 | silica | 45 | 20 |
| C. Ex. 1 | A | crosslinked polystyrene | 28 | — | — | E | 70 | acrylic copolymer | 40 | 20 |
| C. Ex. 2 | B | silica | 13 | D | 3 | B | 52 | crosslinked polystyrene | 50 | 35 |
| C. Ex. 3 | A | silica | 13 | D | 30 | F | 30 | silica | 22 | 30 |
| C. Ex. 4 | A | acrylic copolymer | 150 | D | 30 | A | 45 | crosslinked polystyrene | 50 | 15 |
| C. Ex. 5 | B | crosslinked polystyrene | 28 | C | 90 | — | — | — | — | — |

| | properties of coating layer A | | Ra of coating layer B [nm] | characteristic properties of film | | | characteristic properties of magnetic recording medium | | |
|---|---|---|---|---|---|---|---|---|---|
| | density of protrusions [unit: $10^6$/mm$^2$] | Ra [nm] | | Electrostatic properties | blocking | transferred foreign matter | electromagnetic conversion characteristics C/N | D/O | adhesion of back coat |
| Ex. 1 | 20 | 0.7 | 2.5 | ○ | ○ | ○ | ○ | ○ | Δ |
| Ex. 2 | 7 | 0.8 | 4.5 | ○ | ○ | ○ | ○ | ○ | ○ |
| Ex. 3 | 12 | 0.6 | 5.5 | ○ | ○ | ○ | ○ | ○ | ○ |
| C. Ex. 1 | 10 | 0.6 | 2.5 | × | × | × | ○ | × | ○ |
| C. Ex. 2 | 14 | 0.6 | 5 | Δ | Δ | × | Δ | × | ○ |
| C. Ex. 3 | 200 | 1.8 | 2.4 | ○ | ○ | ○ | × | Δ | ○ |
| C. Ex. 4 | 5 | 3.0 | 6.6 | ○ | ○ | ○ | × | Δ | ○ |
| C. Ex. 5 | 300 | 1.5 | 3.3 | ○ | Δ | ○ | ○ | ○ | × |

Ex.: Example, C. Ex.: Comparative Example
(Notes) Type of resin of coating layer
A; acryl-modified polyester (IN-170-6 of Takamatsu Yusi Co., Ltd.)
B; copolyester (2,6-naphthalenedicarboxylic acid/isophthalic acid/5-sodium sulfoisophthalic acid//ethylene glycol/ adduct of bisphenol A with two moles of propylene oxide)
C; acrylic acid polyester/methyl cellulose (SM-15 of Shin-Etsu Chemical Co., Ltd.) = 3/1
D; copolyester/methyl cellulose = 5/2
E; bisamide-based wax (NS-120 of Matsumoto Yusi Co., Ltd.)
F; silicone (X-22-8053 of Shin-Etsu Chemical Co., Ltd.)
*1 core-shell-type particle consisting of a shell portion made from an acrylic copolymer and a core portion made from a styrene/divinylbenzene copolymer

Example 4

Dimethyl terephthalate and ethylene glycol were polymerized in the presence of manganese acetate as an ester interchange catalyst, antimony trioxide as a polymerization catalyst and phosphorous acid as a stabilizer in accordance with a commonly used method to give polyethylene terephthalate (PET) containing substantially no inert particles.

This polyethylene terephthalate was dried at 170° C. for 3 hours, supplied to an extruder, molten at a temperature of 280 to 300° C., extruded into a sheet from a die and quenched to give a 82-μm-thick unstretched film.

The obtained unstretched film was preheated, stretched to 3.2 times in a longitudinal direction between low-speed and high-speed rolls at a film temperature of 95° C. and quenched. A water-soluble coating solution having composition for forming the coating layer A shown in Tables 2 and 3 was applied to one side of this stretched film to a thickness of 0.009 μm (after stretching and drying) and a water-soluble coating solution for forming the coating layer B was applied to the other side of the film to a thickness of 0.035 μm (after stretching and drying). Thereafter, the film was supplied to a stenter to be stretched to 4.1 times in a transverse direction at 110° C. The obtained biaxially oriented film was heat-set with hot air of 220° C. for 4 seconds to give a 5.9-μm-thick biaxially oriented polyester film. The results are shown in Tables 2 and 3 below.

Comparative Examples 6 to 8

Biaxially oriented polyester films were obtained in the same manner as in Example 4 except that the compositions of the coating layer A and the coating layer B were changed as shown in Tables 2 and 3. The results are shown in Tables 2 and 3.

Example 5 and Comparative Example 9

Biaxially oriented polyester films were obtained in the same manner as in Example 4 except that polyester terephthalates for the first and second thermoplastic resin layers shown in Tables 2 and 3 were supplied to two respective extruders to be laminated together using a multimanifold coextrusion die and that an aqueous coating solution for the coating layer A having composition shown in Table 2 was applied to the first layer side and an aqueous coating solution for the coating layer B was applied to the second layer side. The results are shown in Tables 2 and 3.

Example 6 and Comparative Example 10

Polyethylene-2,6-naphthalate (PEN) was obtained in the same manner as in Example 4 except that particles shown in Tables 2 and 3 were used and that dimethyl 2,6-naphthalenedicarboxylate was used in place of dimethyl terephthalate in the same molar amount.

This polyethylene-2,6-naphthalate was dried at 170° C. for 6 hours to obtain unstretched films of each of Example and Comparative Example in the same manner as in Example 4.

The obtained unstretched films were preheated, stretched to 3.5 times in a longitudinal direction between low-speed and high-speed rolls at a film temperature of 95° C. and quenched. Aqueous coating solutions for the coating layer A and the coating layer B shown in Table 2 and Table 3 were applied to the films in the same manner as in Example 4. Thereafter, the films were supplied to a stenter to be stretched to 5.6 times in a transverse direction at 155° C. The obtained biaxially oriented films were heat-set with hot air of 200° C. for 4 seconds to give biaxially oriented polyester films. The results are shown in Tables 2 and 3 below.

Example 7 and Comparative Example 11

Biaxially oriented polyester films were obtained in the same manner as in Example 6 except that polyethylene-2,6-naphthalates were laminated together by coextrusion as shown in Tables 2 and 3. The results are shown in Tables 2 and 3.

As is evident from Table 3, the thermoplastic resin film of the present invention is excellent in low electrostatic properties, blocking resistance and abrasion resistance, and is remarkably excellent electromagnetic conversion characteristics and adhesion of a back coat when used as a magnetic recording medium. In contrast to this, films which do not satisfy the requirements of the present invention cannot achieve these characteristic properties at the same time.

TABLE 2

|  | coating layer A | | | thermoplastic resin layer first layer | | | |
|---|---|---|---|---|---|---|---|
|  |  | contained particles A | | | contained particles | | |
|  | type of resin | material | average particle diameter [nm] | type | material | average particle diameter [nm] | content [wt %] |
| Ex. 4 | A | acrylic copolymer | 30 | PET | none | — | — |
| Ex. 5 | B | crosslinked polystyrene | 28 | PET | silica | 60 | 0.03 |
| Ex. 6 | A | silica | 13 | PEN | silica | 60 | 0.01 |
| Ex. 7 | A | core-shell*1 type particle | 25 | PEN | none | — | — |
| C. Ex. 6 | A | acrylic copolymer | 30 | PET | none | — | — |
| C. Ex. 7 | B | silica | 13 | PET | crosslinked polystyrene | 160 | 0.025 |
| C. Ex. 8 | A | silica | 13 | PET | silica | 300 | 0.50 |
| C. Ex. 9 | A | acrylic copolymer | 40 | PET | none | — | — |

TABLE 2-continued

| | | | | | | | |
|---|---|---|---|---|---|---|---|
| C. Ex. 10 | B | crosslinked polystyrene | 28 | PEN | silica | 80 | 0.015 |
| C. Ex. 11 | B | acrylic copolymer | 40 | PEN | none | — | — |

| | thermoplastic resin layer second layer | | | | | |
|---|---|---|---|---|---|---|
| | particles having the largest average particle diameter | | | other particles | | |
| | type | material | average particle diameter [nm] | content [wt %] | material | average particle diameter [nm] | content [wt %] |
| Ex. 4 | — | — | — | — | — | — | — |
| Ex. 5 | PET | silica | 300 | 0.05 | silica | 50 | 0.30 |
| Ex. 6 | — | — | — | — | — | — | — |
| Ex. 7 | PEN | crosslinked polystyrene | 500 | 0.01 | θ-alumina | 200 | 0.20 |
| C. Ex. 6 | — | — | — | — | — | — | — |
| C. Ex. 7 | — | — | — | — | — | — | — |
| C. Ex. 8 | — | — | — | — | — | — | — |
| C. Ex. 9 | PET | silica | 500 | 0.02 | θ-alumina | 200 | 0.30 |
| C. Ex. 10 | — | — | — | — | — | — | — |
| C. Ex. 11 | PEN | crosslinked polystyrene | 500 | 0.01 | silica | 100 | 0.27 |

| | coating layer B | | contained particles B | | | layer thickness | | | |
|---|---|---|---|---|---|---|---|---|---|
| | type of resin | additive type | additive content [wt %] | material | average particle diameter [nm] | content [wt %] | coating layer A [μm] | thermoplastic resin layer single layer [μm] | thermoplastic resin layer double layer [μm] | coating layer B [μm] |
| Ex. 4 | C | E | 5 | acrylic copolymer | 40 | 20 | 0.009 | 5.9 | — | 0.035 |
| Ex. 5 | C | F | 1 | silica | 50 | 15 | 0.009 | 8.0 | 1.0 | 0.015 |
| Ex. 6 | D | F | 1 | acrylic copolymer | 40 | 8 | 0.006 | 4.0 | — | 0.030 |
| Ex. 7 | D | F | 3 | acrylic copolymer | 40 | 5 | 0.007 | 4.2 | 0.6 | 0.030 |
| C. Ex. 6 | C | — | — | acrylic copolymer | 40 | 20 | 0.009 | 6.0 | — | 0.035 |
| C. Ex. 7 | C | E | 40 | crosslinked polystyrene | 55 | 38 | 0.009 | 7.5 | — | 0.400 |
| C. Ex. 8 | D | F | 3 | crosslinked polystyrene | 22 | 30 | 0.006 | 8.8 | — | 0.028 |
| C. Ex. 9 | — | — | — | — | — | — | 0.005 | 5.0 | 1.0 | — |
| C. Ex. 10 | C | E | 10 | silica | 50 | 10 | 0.007 | 5.2 | — | 0.018 |
| C. Ex. 11 | C | E | 3 | silica | 50 | 10 | 0.001 | 6.0 | 0.8 | 0.020 |

Ex.: Example, C. Ex.: Comparative Example

TABLE 3

| | properties of coating layer A | | | Ra of coating layer B [nm] | characteristic properties of film | | | characteristic properites of magnetic recording medium | |
|---|---|---|---|---|---|---|---|---|---|
| | density of protrusions [unit: 10⁶/mm²] | t/d | Ra [nm] | | Electrostatic properties | blocking | abrasion resistance | electromagnetic conversion characteristics C/N | adhesion of back coat |
| Ex. 4 | 10 | 0.30 | 0.6 | 2.5 | ○ | ○ | ○ | ○ | ○ |
| Ex. 5 | 5 | 0.32 | 0.8 | 5.8 | Δ | Δ | ○ | ○ | ○ |
| Ex. 6 | 20 | 0.46 | 0.8 | 3 | Δ | Δ | ○ | ○ | ○ |
| Ex. 7 | 10 | 0.28 | 0.6 | 7.2 | ○ | ○ | ○ | ○ | ○ |
| C. Ex. 6 | 10 | 0.30 | 0.6 | 3.1 | × | × | ○ | ○ | ○ |
| C. Ex. 7 | 50 | 0.69 | 1.0 | 3.9 | ○ | ○ | Δ | Δ | × |

TABLE 3-continued

| | properties of coating | | | Ra of coating layer B [nm] | characteristic properties of film | | | characteristic properites of magnetic recording medium | |
|---|---|---|---|---|---|---|---|---|---|
| | layer A | | | | | | | electromagnetic conversion characteristics C/N | adhesion of back coat |
| | density of protrusions [unit: $10^6$/mm$^2$] | t/d | Ra [nm] | | Electrostatic properties | blocking | abrasion resistance | | |
| C. Ex. 8 | 5 | 0.46 | 3.0 | 2.4 | ○ | ○ | ○ | × | ○ |
| C. Ex. 9 | 14 | 0.13 | 0.6 | 8 | × | × | ○ | ○ | ○ |
| C. Ex. 10 | 300 | 0.25 | 1.5 | 3.3 | ○ | ○ | × | × | Δ |
| C. Ex. 11 | 25 | 0.03 | 0.6 | 6.9 | ○ | ○ | × | ○ | ○ |

Ex.: Example, C. Ex.: Comparative Example

What is claimed is:

1. A low electrostatic composite polyester film comprising a base film C, a coating layer A formed on one side of the base film C, and a coating layer B formed on the other side of the base film C, wherein
   (1) the coating layer A is formed of a water-soluble or water-dispersible resin containing inert particles having an average particle diameter of 5 to 100 nm and has protrusions at a density of $1 \times 10^6$ to $1 \times 10^8$/mm$^2$ on the outer surface and a center line average roughness (Ra–A) of the outer surface of 0.1 to 2 nm;
   (2) the coating layer B comprises 1 to 40 wt % of inert particles having an average particle diameter of 20 to 100 nm and 60 to 99 wt % of a composition containing a water-soluble resin or a water-dispersible resin, the resin-containing composition containing 5 to 85 wt % of a silicone-modified polyester resin and 0 to 20 wt % of a surfactant based on the layer B; and
   (3) the base film C is formed of an aromatic polyester which contains no inert particles or contains inert particles having an average particle diameter of 5 to 2,000 nm in an amount of 0.001 to 5.0 wt %.

2. The low electrostatic composite polyester film according to claim 1, wherein the water-soluble or water-dispersible resin forming the coating layer A is at least one resin selected from the group consisting of acrylic resins, polyester resins and acryl-polyester resins.

3. The low electrostatic composite polyester film according to claim 1, wherein the outer surface of the coating layer B has a center line average roughness (Ra–B) of 1 to 30 nm.

4. The low electrostatic composite polyester film according to claim 1, wherein the inert particles contained in the coating layer A, the coating layer B and the base film C are made from organic compounds and/or inorganic compounds which are different or the same in type and average particle diameter, the organic compounds are selected from core-shell-structured particles of crosslinked polystyrene, polystyrene-divinylbenzene, polymethyl methacrylate, methyl methacrylate copolymer, methyl methacrylate crosslinked copolymer, polytetrafluoroethylene, polyvinylidene fluoride, polyacrylonitrile, benzoguanamine resin and graft copolymers comprising these polymers, and the inorganic compounds are selected from silica, alumina, titanium dioxide, feldspar, kaolin, talc, graphite, calcium carbonate, molybdenum disulfide, carbon black and barium sulfate.

5. The low electrostatic composite polyester film according to claim 1, wherein the resin-containing composition further contains 5 to 40 wt % of a cellulose resin based on the coating layer B.

6. The low electrostatic composite polyester film according to claim 1, wherein the coating layer A has a thickness of 1 to 100 nm.

7. The low electrostatic composite polyester film according to claim 1, wherein the coating layer B has a thickness of 1 to 100 nm.

8. The low electrostatic composite polyester film according to claim 1, wherein the base film C has a thickness of 1 to 30 μm.

9. A magnetic recording medium having a magnetic recording layer on the outer surface of the coating layer A of the composite polyester film of claim 1.

10. A low electrostatic composite polyester film comprising a base film C, a coating layer A formed on one side of the base film C, and a coating layer B formed on the other side of the base film C, wherein
    (1) the coating layer A is formed of a water-soluble or water-dispersible resin containing inert particles having an average particle diameter of 5 to 100 nm and has protrusions at a density of $1 \times 10^6$ to $1 \times 10^8$/mm$^2$ on the outer surface and a center line average roughness (Ra–A) of the outer surface of 0.1 to 2 nm;
    (2) the coating layer B comprises 1 to 40 wt % of inert particles having an average particle diameter of 20 to 100 nm and 60 to 99 wt % of a composition containing a water-soluble resin or a water-dispersible resin, the resin-containing composition containing 1 to 30 wt % of silicone based on the layer B; and
    (3) the base film C is formed of an aromatic polyester which contains no inert particles or contains inert particles having an average particle diameter of 5 to 2,000 nm in an amount of 0.001 to 5.0 wt %.

11. The low electrostatic composite polyester film according to claim 10, wherein the resin-containing composition comprises (i) 1 to 30 wt % of silicone, (ii) 40 to 99 wt % of at least one resin selected from the group consisting of acrylic resins, polyester resins and acryl-polyester resins and (iii) 0 to 20 wt % of a surfactant based on the coating layer B.

12. The low electrostatic composite polyester film according to claim 11, wherein the resin-containing composition contains 5 to 40 wt % of a cellulose resin based on the coating layer B.

\* \* \* \* \*